United States Patent [19]

Stensel et al.

[11] 4,303,516
[45] Dec. 1, 1981

[54] ORBITAL WASTEWATER TREATMENT SYSTEM WITH INTEGRAL CLARIFICATION

[75] Inventors: H. David Stensel, Summit Park; Peter Maier; Mark G. Biesinger, both of Salt Lake City; David R. Refling, Summit Park; Ronald P. Klepper; John V. Maxham, both of Salt Lake City, all of Utah

[73] Assignee: Envirotech Corporation, Menlo Park, Calif.

[21] Appl. No.: 196,404

[22] Filed: Oct. 14, 1980

[51] Int. Cl.³ .............................................. C02F 3/16
[52] U.S. Cl. ................................. 210/195.4; 210/197; 210/219; 210/521; 210/525; 210/926

[58] Field of Search ............ 210/194, 197, 926, 195.3, 210/628, 629, 521, 525, 526, 527, 170, 219, 195.4

[56] References Cited

U.S. PATENT DOCUMENTS

| | | | |
|---|---|---|---|
| 1,135,997 | 4/1915 | Dorr | 210/521 |
| 3,905,904 | 9/1975 | Cherne et al. | 210/197 |
| 4,226,717 | 10/1980 | Malm | 210/926 |

Primary Examiner—Benoît Castel
Attorney, Agent, or Firm—Robert E. Krebs; Thomas J. McNaughton

[57] ABSTRACT

There is provided a system for treating wastewater having a tank and a partition mounted in the tank to define an endless circuitous channel. An aerator and impeller is mounted in the tank to cause the liquid to flow through the channel. A clarifier is disposed in the channel and has a liquid outlet in its upper portion.

8 Claims, 5 Drawing Figures

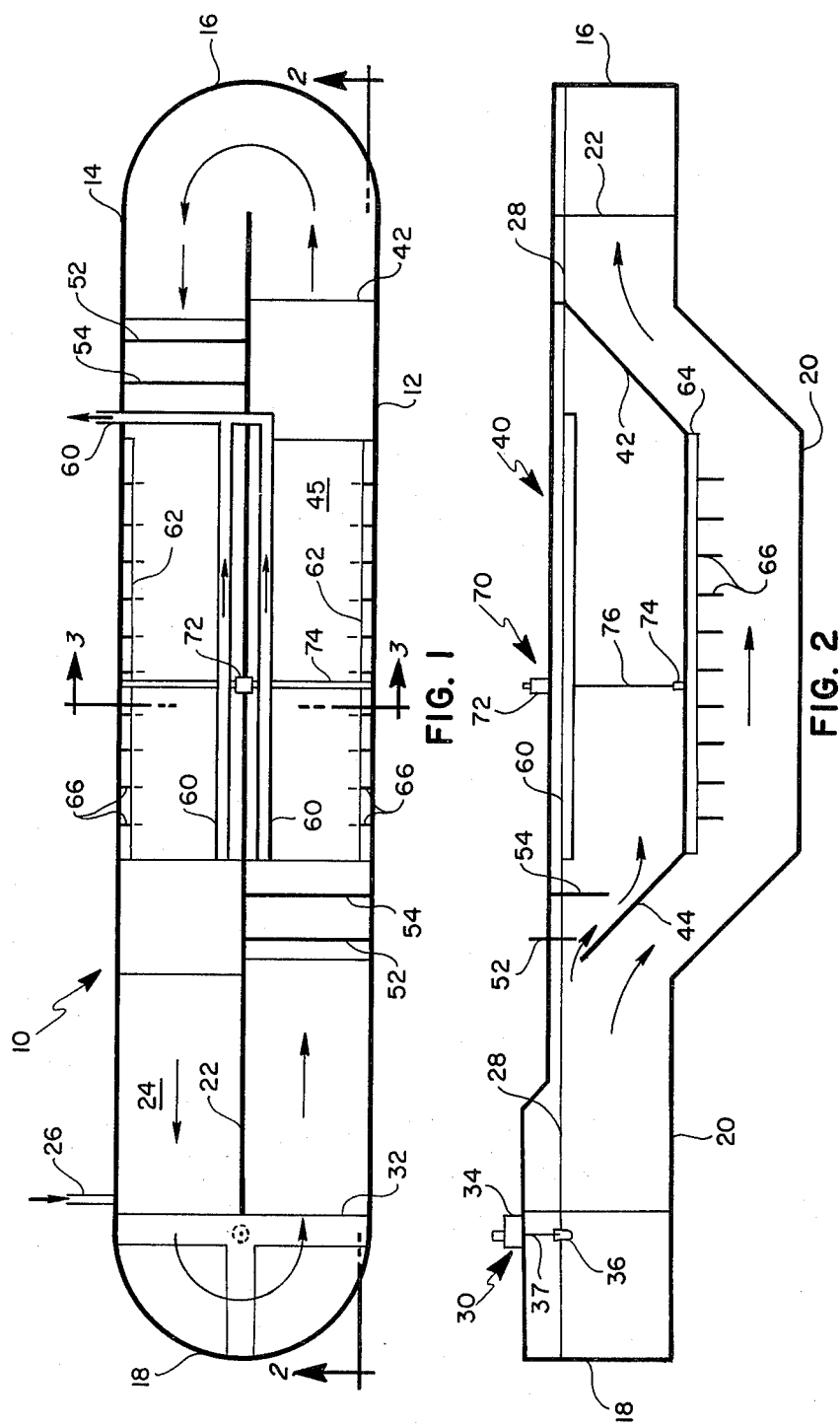

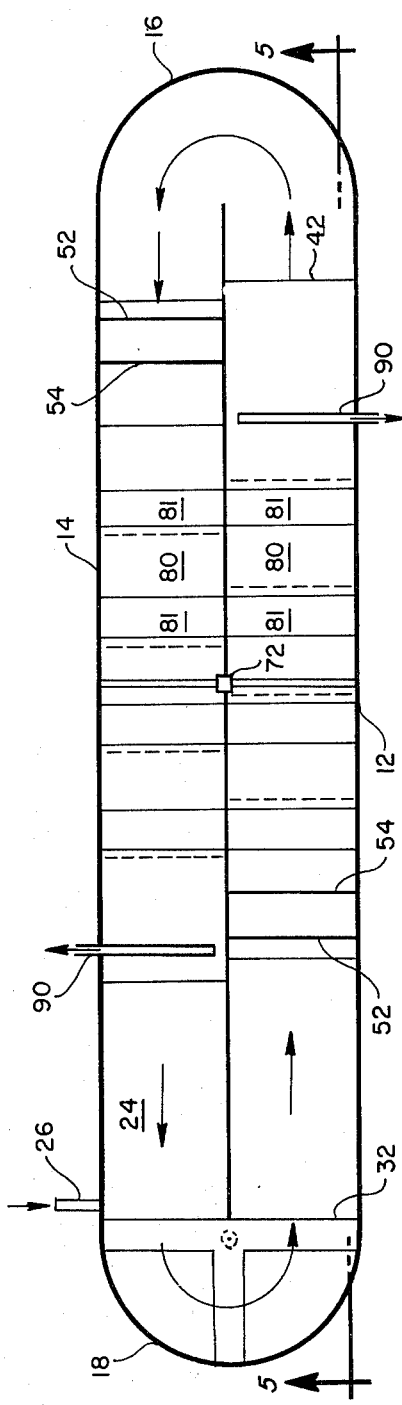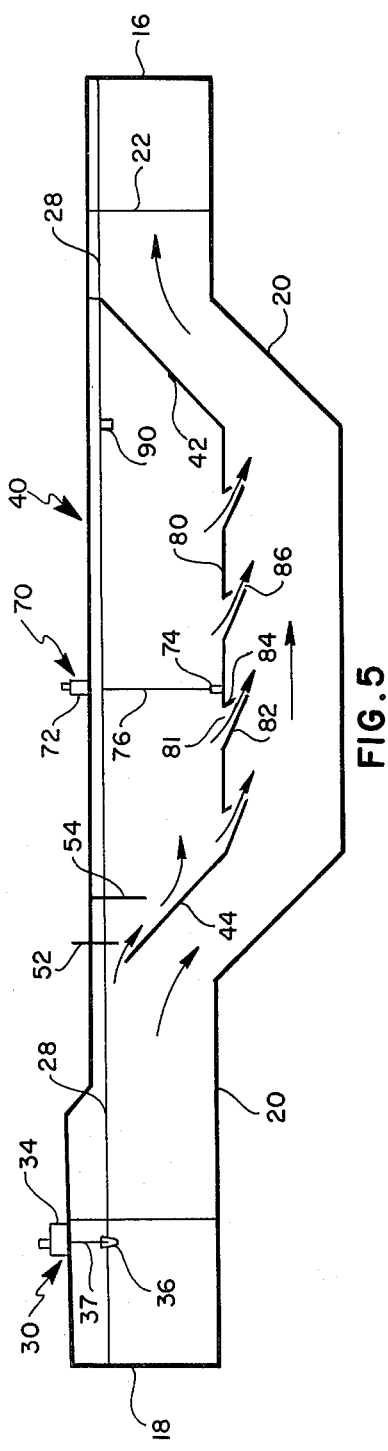

ORBITAL WASTEWATER TREATMENT SYSTEM WITH INTEGRAL CLARIFICATION

BACKGROUND OF THE INVENTION

1. Field of the Invention:

This invention relates to a system for treating wastewater.

2. State of the Art:

Domestic sewage and industrial wastewater often contain impurities which include materials such as sugars and other carbohydrates and proteins and other forms of nitrogen. Many of these impurities or pollutants are decomposable by microorganisms, and there are various types of systems to remove the impurities from wastewater by action of microorganisms. One type of wastewater treatment system is known as an orbital system, sometimes referred to as an oxidation ditch system.

Generally speaking, an orbital wastewater treatment system includes an elongated tank having two sidewalls and at least one partition wall mounted vertically in the tank substantially parallel to the two sidewalls and spaced apart from the ends of the tank. The tank and partition wall together form an endless, circuitous channel to contain a stream of liquid. An orbital wastewater treatment system also includes means to cause the liquid to flow through the channel and an aerating means to introduce air into the liquid to provide oxygen for the microorganisms. Orbital wastewater treatment systems are taught, for example, in U.S. Pat. Nos. 3,510,110 and 3,846,292. According to U.S. Pat. No. 3,846,292 influent wastewater is introduced into the tank and driven to flow around the endless, circuitous channel. A stream of treated liquid, less than the total flow in the channel, is removed from the channel and transferred into a solid-liquid separator, or clarifier, spaced apart from the orbital system. In the separator, solid particles form sludge which settles, and part is returned to the orbital system to mix with the wastewater to form mixed liquor. Clarified liquid is transferred from the separator to a stream or other body of water. The purpose of returning sludge to the orbital system is to maintain a predetermined concentration of microorganisms in the mixed liquor thereby to accomplish biological removal of pollutants from the wastewater.

The construction of a conventional orbital system such as taught in the patent requires that the circuitous channel be constructed and that a separate sludge separation system also be constructed. Additionally, a system of pipes and pumps must be installed to permit diversion of wastwater from the orbital system to the separator and return of sludge from the separator to the orbital system.

OBJECTS OF THE INVENTION

According to the presently preferred system there is a tank having an upstanding partition wall mounted in the center so that the tank and the partition wall define an endless, circuitous channel to contain a stream of mixed liquor. An aerating-impelling device is mounted near one end of the partition wall for mixing air with the liquid in the tank and impelling the liquid to flow through the endless, circuitous channel. A wastewater inlet is mounted in flow communication with the tank to introduce the wastewater. A clarifier is formed integrally within the tank and disposed in the endless, circuitous channel to extend at least between one of the sidewalls and the partition. The clarifier receives part of the liquid flowing through the channel and retains the liquid in a substantially quiescent state so that sludge settles from the liquid to form clarified liquid near the upper part of the quiescent zone and sludge in the lower part. A sludge transfer system is provided to convey the sludge from the lower part of the clarifier back into the circuitous channel, and a liquid outlet means is formed in the upper part of the clarifier to permit clarified liquid to be removed from the quiescent zone.

Thus, it can be seen that according to the present system the clarification and separation of liquid from solids is achieved without the necessity of providing a separate sedimentation tank. Furthermore, it should be appreciated that sludge is continuously transferred from the clarifier into the mixed liquor in the circuitous channel simply and easily without the complicated system of pumping and piping required by the prior art.

Further objects of the present invention may be readily determined by reference to the following description and drawings, which are offered by way of example only and not in limitation of the invention, the scope of which is defined by the appended claims and equivalents to the structure, materials and acts set forth hereinafter.

BRIEF DESCRIPTION OF THE DRAWING

FIG. 1 is a plan view of a preferred embodiment of the present invention.

FIG. 2 is a cross-sectional elevation of the system shown in FIG. 1 taken along line 2—2.

FIG. 4 is a plan view of another embodiment of the present invention.

FIG. 5 is a cross-sectional elevation of the system shown in FIG. 4 taken along line 5—5.

DETAILED DESCRIPTION OF THE PREFERRED EMBODIMENTS

Figure 3:
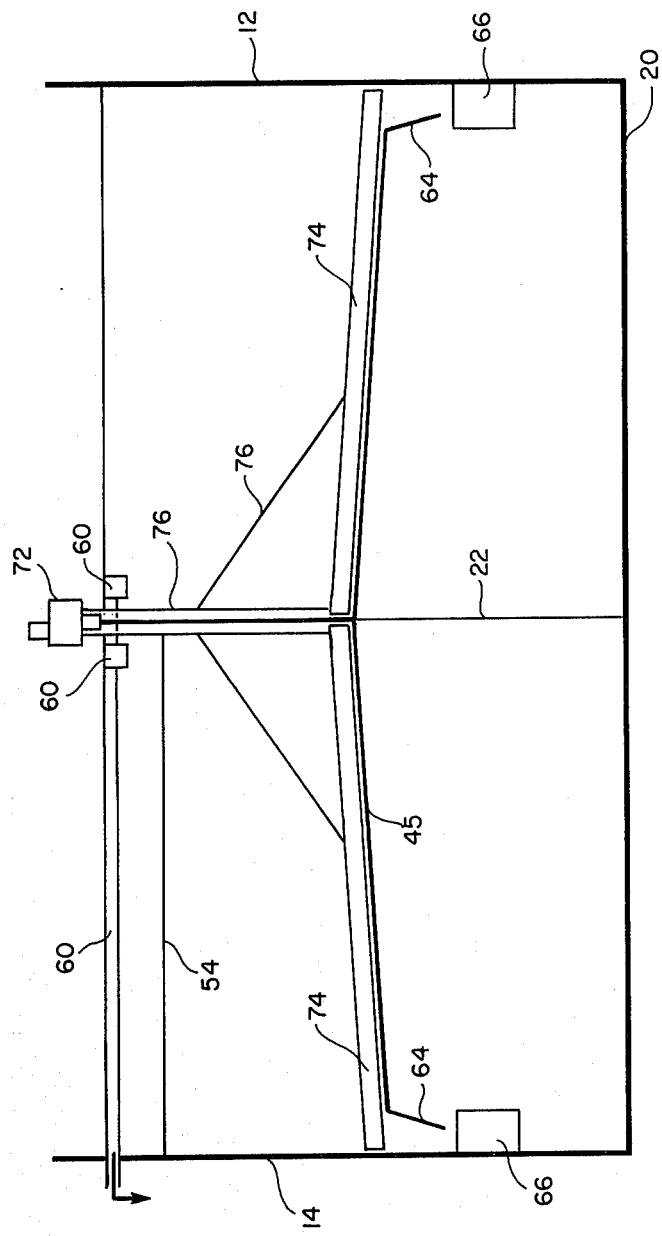
FIG. 3 is a cross-section of the system shown in FIGS. 1 and 2, taken along line 3—3.

The embodiment shown in FIGS. 1-3 includes an elongated liquid-holding tank 10 which has two vertical sidewalls 12 and 14 and two vertical end walls 16 and 18 connected between the sidewalls 12 and 14. The tank 10 has a floor 20 connected between the sidewalls and the end walls so that the tank can contain liquid. A vertically-disposed partition wall 22 is mounted between and substantially parallel to the sidewalls 12 and 14 and spaced-apart from the end walls 16 and 18 so that an endless, circuitous channel 24 is formed in the tank. An inlet conduit 26 is coupled to the tank to permit wastewater to be introduced into the tank to fill the tank to a level 28.

At the end of the tank near end wall 18, an aerating-impelling means 30 is disposed to aerate the mixed liquor in the tank while impelling it to flow through the channel as indicated by the arrows. The aerating and impelling means is supported in the tank by a support structure 32, and includes a motor and drive unit 34 coupled to drive an impeller 36. The impeller 36 is conventional and comprises a plurality of substantially vertically disposed blades which extend radially from a shaft 37. The impeller 36 is located slightly below the liquid level 28 so that as the impeller rotates, the liquid in the channel is driven to move as indicated by the arrows, and the liquid is agitated so that air is mixed therewith.

A clarifier 40 is formed integrally to the tank within the circuitous channel. The clarifier 40 includes two baffle plates 42 and 44 which are substantially flat and extend between the sidewalls 12 and 14 and the partition wall 22. The baffles are disposed with their upper ends above the liquid surface 28 and their lower ends substantially below the liquid surface. The baffles are oriented at an angle from the horizontal so that liquid flowing through the channel 24 is directed downwardly as it meets the upstream baffle 44 and upwardly as it passes beneath the downstream baffle 42. Two substantially flat plates form a floor 45 and are connected between the lower ends of the baffles 42 and 44 and between the sidewalls and the partition wall 22. The floor 45 is higher near the partition wall 22 than near the sidewalls 12 and 14 to facilitate the movement of sludge toward the sidewalls.

It should be noted that the floor 20 is lower beneath the clarifier 40 than elsewhere and that the floor 20 is substantially parallel to the baffles 42 and 44 beneath the baffles. Thus, the channel 24 provides substantially the same cross-sectional area for liquid flow throughout its length.

An inlet means is formed in the upstream section of baffle 44, which extends between sidewall 12 and partition wall 22, to permit mixed liquor to flow from the circuitous channel 24 into the clarifier 40. The inlet means includes a weir formed by the upper edge of the baffle 44 which is located a small distance below the surface of the liquid in the channel. The weir extends between the wall 22 on the left, and the sidewall 12 on the right. A vertically positionable baffle plate 52 is coupled to the partition wall 22 and sidewall 12 to permit the area of the inlet means to be selectively varied thus allowing control of the flow of liquid into the clarifier 40. A vertically disposed baffle plate 54 is connected between the sidewall 12 and partition wall 22 and spaced apart from the baffle plate 52 so that liquid flowing through the inlet means is directed downwardly into the clarifier 40 as shown by the arrows in FIG. 2.

It should be understood that a second inlet means is formed in the upstream section of baffle 42, which extends between the sidewall 14 and the partition wall 22. The second inlet means is substantially the same as the inlet means formed in baffle 44 and discussed above.

Effluent channels 60 are coupled to the partition wall 22 to provide a means to remove clarified liquid from the upper portion of the clarifier 40. Two effluent channels 60 are formed parallel to the partition wall 22 and spaced a short distance therefrom. Each effluent channel 60 extends for a substantial part of the length of the clarifier 40 and is spaced apart from the baffles 42 and 54. Each channel 60 has imperforate sides and a bottom, while the top of the effluent channels 60 are open. The top edges of the effluent channel 60 are located at substantially the same elevation as the liquid level 28 in the tank so that liquid from the tank can spill over the upper edges of the channels. A third effluent channel 60 is connected between the two parallel channels 60. The third channel 60 is substantially the same as the first and second channels and serves to convey liquid from the clarifier 40.

Two ports 62 are formed in the floor 45 to permit sludge to flow from the clarifier 40 into the channel 24. One port 62 is formed adjacent each of the two sidewalls 12 and 14, and the ports 62 extend between the lower ends of the baffles 42 and 44. A plurality of stilling plates are affixed beneath the ports 62 to reduce or eliminate any turbulence beneath the ports 62 which might disturb the flow of sludge therefrom. Two stilling plates 64 are coupled to the floor 45, one adjacent each port 62. The stilling plates 64 extend the length of the floor 45 and extend vertically downward therefrom. Beneath the stilling plates 64 a plurality of stilling plates 66 are affixed to the sidewalls 14 and 12 of the tank. The stilling plates 66 are rectangular and are disposed below the lower edges of the stilling plates 64.

A sludge scraper mechanism 70 is disposed in the clarifier 40 to move sludge which collects on the bottom of the clarifier to the ports 62. The sludge scraper 70 includes a drive mechanism 72 disposed atop the partition wall 22 and mounted to move along the partition wall. Two blades 74 are coupled to the drive 72 by support members 76. The blades 74 are disposed immediately atop and parallel to the floor 45. Two actuator posts, not shown, are disposed atop the partition wall 22 at either end of the extent of travel of the sludge scraper 70. The drive 72 includes actuating means, not shown, which interact with the actuator posts when the drive means contacts either post so that the actuating means reverses the direction of travel of the drive 72.

In operation of the system according to FIGS. 1–3, wastewater is introduced into the channel by line 26. The impeller 36 is driven to rotate in a counterclockwise direction as shown by the arrow in FIG. 1 thereby driving the mixed liquor to travel through the channel as indicated by the arrows. As the mixed liquor travels through the channel, microorganisms use the oxygen dissolved in the mixed liquor to metabolize the pollutants while creating additional microorganisms.

The mixed liquor traveling through the channel 24 encounters the upstream baffle 44, and the major part of the flow is directed downwardly by the baffle 44 while part of the flow travels over the upper edge of the baffle. The mixed liquor flows over the upper edge of the baffle 44, below the baffle plates 52 and 54 and into the body of liquid inside the clarifier 40.

The zone between the baffles 42 and 44 is substantially quiescent so that solid particles including microorganisms and other solid matter in the mixed liquor settle while the clear liquid rises. The clear or clarified liquid flows over the upper edges of the effluent channel 60 and is carried away from the tank 10. Meanwhile sludge settles to the floor 45 while the sludge scraper travels back and forth to force the blade 74 along the floor 45. Thus the sludge on the floor 45 is scraped to the ports 62 and flows downwardly into the stream of mixed liquor flowing beneath the clarifier 40. It should be understood that as the mixed liquor travels through the channel beneath the clarifier 40, there is a possibility of creating currents near the ports 62 which could disturb the downward flow of sludge. However, stilling plates 64 and 66 have been found to substantially reduce any turbulence in the vicinity of the ports 62, thereby enhancing the downward flow of sludge.

It can be appreciated that the inlet means is disposed to receive flow from the channel 24. Thus the force of the flowing liquid carries the mixed liquor into and through the clarifier 40. That is, a continuous stream of liquid flows through the clarifier 40 and downward through the ports 62 thus carrying sludge out the ports. Also, sludge flows by gravity downward through the ports 62 from the clarifier directly into the wastewater. Thus, disadvantages of the prior art requiring pumping of mixed liquor into a clarifier and the pumping of sludge from the clarifier back to the mixed liquor have been eliminated by the present system.

It should be understood that the system shown in FIGS. 1-3 can be modified to include a substantially different inlet to the clarifier 40. In particular, the baffle 44 can be formed without means to permit flow into the clarifier 40. Thus, liquid enters the clarifier 40 only through the ports 62. In practice it has been found that mixed liquor can flow upward through ports 62 while sludge flows downward through the same ports without disturbing the flow of sludge if the rates of flow of sludge and liquor are adequately controlled and the ports 62 carefully designed.

Turning to the embodiment shown in FIGS. 4-5, the embodiment includes components similar to those shown in FIGS. 1-3, and like parts are numbered the same in all figures. According to the embodiment shown in FIGS. 4-5, the clarifier 40 has a floor which is comprised of a plurality of plates. In particular, a plurality of plates 80 are disposed substantially horizontally and are connected to the sidewalls and the partition wall 22 to extend therebetween. Each of the plates 80 is spaced apart from adjacent plates 80 so that ports 81 are formed therebetween, and the ports 81 are substantially rectangular in shape. A plurality of flow-restricting means are coupled to the floor 80 to extend downwardly therefrom. The flow-restricting means comprise a plurality of plates 82 which are disposed at an angle with respect to the horizontal. Each of the plurality of plates 82 is substantially rectangular, is coupled between one of the sidewalls 12 or 14 and the partition wall 22 and has its upper edge coupled to one edge of a plate 80. The opposite edge of each plate 82 is lower than the plates 80. A plate 84 is also coupled at the edge of each plate 80 opposite the edge coupled to the plate 82. Each plate 84 is rectangular, and disposed between a wall 12 or 14 and a partition wall 22, and oriented at a substantial angle from the horizontal. Each plate 84 extends downwardly and has its lower edge spaced apart from the lower edge of each plate 82. Thus, a plurality of rectangular ports 86 is formed between the lower edges of the plates 82 and 84 to permit sludge to flow downwardly therethrough.

In the upper part of the clarifier 40 two effluent channels 90 are located one at each end of the clarifier 40 opposite the inlet means. The effluent channels 90 comprise two channels parallel one another and disposed substantially perpendicular to the direction of flow in the channel. The effluent channels have substantially imperforate sides and bottom, and are open at the top, with the top located substantially at the elevation of the liquid in the clarifier so that liquid from the clarifier flows into the channels.

The operation of the embodiment shown in FIGS. 4-5 is similar to that of the system shown in FIGS. 1-3. However, according to the system shown in FIGS. 4-5, sludge is drawn from the bottom of the clarifier by venturi action. In particular, the plates 82 and 84 forming the floor of the clarifier are located so that a restricted passage is formed and thereby the velocity of the flowing wastewater in the vicinity of the ports 86 is increased thereby drawing sludge from the clarifier 40. It should be understood that in both the upper and lower parts of the channel 24, as shown in FIG. 4, the ports 86 are located downstream of the ports 81 so that this feature of flow restriction is advantageously utilized to draw sludge from the clarifier.

It should be understood that although according to the drawing each orbital system includes an endless, circuitous channel having two straight legs, systems according to the present invention can have more than two straight legs. Furthermore, according to the systems shown and described herein, there is only one aerating-impelling means. However, orbital systems within the scope of this invention can have more than one aerating-impelling means. Also, the aerating-impelling means according to the present invention can be not only an impeller disposed about a vertical axis, but also ejectors such as taught in U.S. Pat. No. 3,846,292, brushes, and rotating perforated discs which are conventional in some orbital systems, and other aerating-impelling means. Such aerating-impelling means need not be located near an end wall of the channel, but are appropriately located depending upon their particular operating characteristics.

We claim:
1. A system for treating wastewater comprising:
   (a) a tank having at least two sidewalls, at least two end walls, and a bottom;
   (b) at least one partition mounted in said tank substantially parallel to said sidewalls to define an endless, circuitous channel for flow of liquid in said tank;
   (c) aerating-impelling means mounted in said tank for mixing gas with the liquid in said tank and impelling the liquid to flow through said endless, circuitous channel;
   (d) a wastewater inlet mounted in flow communication with said tank for introducing wastewater into said tank;
   (e) clarifier means disposed in the endless, circuitous channel having liquid inlet means to receive part of the liquid, including mixed liquor, flowing through said channel and to retain the liquid in a quiescent zone so that biological sludge settles from the liquid to form supernatant clarified liquid, said clarifier means extending between one of said sidewalls and said partition, and said clarifier means further including
      (i) a first baffle extending at least between one of said sidewalls and one of said partitions,
      (ii) a second baffle spaced apart from said first baffle and extending at least between one of said sidewalls and one of said partitions to form the quiescent zone between said first and second baffles, and
      (iii) a floor means extending between the lower ends of said first and said second baffles,
   (f) sludge transfer means to convey sludge from said clarifier means to said circuitous channel; and
   (g) liquid outlet means connected in fluid flow communication with said clarifier means to remove clarified liquid from the quiescent zone of said clarifier means.

2. A system according to claim 1 wherein said clarifier means extends between one of said sidewalls and another of said sidewalls.

3. A system according to claim 1 wherein the bottom of said tank below said clarifier means is lower than the bottom of said tank not below said clarifier means.

4. A system according to claim 1 wherein said floor means has port means formed therein to permit sludge to flow from the quiescent zone of said clarifier means.

5. A system according to claim 4 wherein said liquid inlet means is formed in the upstream one of said first baffle so that a flow of liquid in said quiescent zone carries sludge outward through said port means.

6. A system according to claim 5 including sludge scraping means disposed in said quiescent zone to scrape sludge along the floor means to said port means.

7. A system according to claim 5 including venturi means coupled to the lower side of said floor means adjacent said port means to utilize the velocity of the liquid flowing in said channel beneath said floor means to draw sludge from said clarifier means.

8. A system according to claim 1 wherein said inlet means includes a weir formed in said one of said baffles and means cooperating with said weir to regulate the flow of liquid into said clarifier means.

* * * * *